United States Patent Office 3,840,532
Patented Oct. 8, 1974

3,840,532
PROCESS FOR CLEAVING CEPHALOSPORIN COMPOUNDS
Harold B. Hayes and Ronald G. Abel, Indianapolis, Ind., assignors to Eli Lilly and Company, Indianapolis, Ind.
No Drawing. Filed May 1, 1972, Ser. No. 249,294
Int. Cl. C07d 99/24
U.S. Cl. 260—243 C        5 Claims

ABSTRACT OF THE DISCLOSURE

In cleaving the carboxamide group in the 7-position of a cephalosporin by blocking the carboxyl groups with mixed anhydrides, formation of an imino halide, conversion of the imino halide to an imino-ether, and hydrolysis of the imino ether to a free amino group, the improvement in which the mixed anhydride reaction, the imino halide formation, imino-ether formation reactions are conducted in tetrahydrofuran, bis(2-methoxyethyl)ether, 2-methoxyethyl acetate, ethylene glycol diacetate, 1,4-dioxane, 1,3-dioxane or mixtures thereof.

INTRODUCTION

This invention related to processes for cleaving cephalosporin compounds to form the respective nuclei which are useful intermediates in making more potent and different cephalosporin antibiotic substances.

CROSS REFERENCES
None.

BACKGROUND OF THE INVENTION

The cephalosporins are a well-known family of antibiotics some of which are widely used in the treatment of disease.

Cephalosporin C, obtained by fermentation, has been defined as having the following structure:

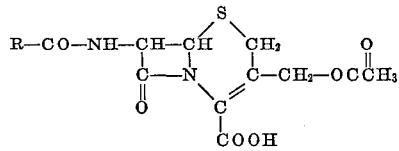

where R is $HOOC-CH(NH_2)-(CH_2)_3-$. It is also known as 7-(5'-aminoadipamido)—cephalosporanic acid. It has weak antibiotic activity, but it is important as a source of cephalosporin C nucleus, that is, 7-aminocephalosporanic acid (7–ACA), having the structural formula

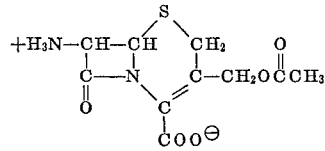

shown here in zwitterionic form, although anionic and cationic salts may be formed and used. Medically important cephalosporin antibiotics, such as cephalothin, cephaloridine, and cephaloglycin are prepared from 7–ACA by known methods. Various derivatives of 7–ACA based antibiotics are made by acylating the 7-amino group of 7–ACA with appropriate acyl acids, halides, or other reactive forms of such acyl groups and/or by replacing the acetoxy group attached to the 3-methyl carbon atom with appropriate nucleophilic groups now well documented in the literature. Thus it can be seen that cephalosporin C is a very valuable fermentation derived antibiotic which is of special interest as a source of starting material for producing numerous other more potent antibiotics.

There are other 7-acylamido cephalosporin compounds which are useful as starting materials in processes for preparing more potent cephalosporin antibiotics. Among such cephalosporin starting materials are desacetoxycephalosporin C [also called 7-(5'-aminoadipamido)desacetoxycephalosporin C] (U.S. Pat. No. 3,124,576) and the 7-acylamidodesacetoxycephalosporins which are obtained from penicillin starting materials via the Morin/Jackson ring expansion reaction (U.S. Pat. No. 3,275,626), especially as improved by Chauvette/Flynn (U.S. Pat. No. 3,436,698), Cooper (U.S. Pat. No. 3,647,787), Hatfield (U.S. Pat. Nos. 3,586,667 and 3,591,585), and Garbrecht (U.S. Pat. No. 3,632,850). In chemical processing of all of these cephalosporins it is desired to cleave the carboxamido group to obtain a free amino group in the 7-position of the cephalosporin. This cleavage reaction is of particular importance in the removal of the aminoadipoyl group from cephalosporin C or from desacetoxycephalosporin C to form 7-aminocephalosporanic acid (7–ACA) or 7-aminodesacetoxycephalosporanic acid (7–ADCA), respectively, and the removal of phenylacetyl or phenoxyacetyl from the 7-acylamidodesacetoxycephalosporinate esters which are obtained from penicillin G and penicillin V, respectively, to obtain the 7-aminodesacetoxycephalosporinate ester nuclei which are used in commercial processes to prepare cephalosporin antibiotics such as cephalexin (U.S. Pat. No. 3,507,861).

One method of cleaving an amido group to obtain the free amine is that described by Lander, *J. Chem. Soc.*, 83, 320 (1903). In accordance with Lander's method the amide is treated with a halogenating agent to convert the amino group into an imino halide followed by treating the imino halide with an alcohol to obtain the imino ether which is then hydrolized, if necessary, to the free amine. The application of this method to the cleavage of cephalosporin C to 7–ACA is disclosed in Canadian Pat. No. 770,125 and British Pat. 1,041,985. Application of this method to 7-acylamidodesacetoxycephalosporins is disclosed in Chauvette U. S. Pat. No. 3,549,623.

In order to successfully apply this sequence of reactions to cephalosporins, it is necessary first to protect the carboxyl group in the molecule. It is particularly important to protect the carboxyl group in the 4-position of the cephalosporin. Heretofore, these carboxyl groups generally have been protected by converting them to esters. With the exception of silyl esters, these esters are generally stable to the reaction conditions and the ester product must be subjected to further treatment in order to obtain the free acid. Such treatment involves more rigorous acid or base hydrolysis or, in some instances, hydrogenolysis. These added steps result in added processing costs, and in the case of more rigorous acid hydrolysis there is some hydrolysis of the acetoxy group at the $C_3$ methylene of cephalosporin C-type compounds to desacetylcephalosporins; in the case of base hydrolysis there is the danger of isomerization of the double bond in the dihydrothiazine ring of cephalosporin C-type compounds. Further, numerous procedures for the preparation of carbon esters lead to isomerization of the double bond in the cephalosporin solvate. A $\Delta^2$ product (isocephalosporin) is obtained. Silyl esters are more sensitive to traces of moisture and therefore less stable than carbon esters during their reaction. In fact, in some instances, they are too easily removed. Further, the reagents used in the preparation of silyl esters are expensive and not always readily available in commercial quantities. In U.S. application Ser. No. 117,043, filed Feb. 19, 1971, Robert R. Chauvette describes an improved process for protecting the carboxyl groups of cephalosporins during the cleavage reaction comprising blocking the carboxyl groups by converting them to a mixed anhydride derived from the acid having the formula $$R'''-CO_2H$$

wherein R''' is $C_1$ to $C_8$ alkyl, alkenyl, or alkynyl; halo-$C_1$ to $C_8$ alkyl, alkenyl, or alkynyl; phenyl

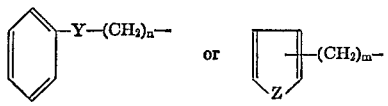

Y is oxygen, sulfur, or a carbon to carbon bond; $n$ is an integer of 0 to 3 and is at least 1 when Y is oxygen or sulfur; Z is oxygen, sulfur or >N—H; and $m$ is an integer of 1 to 3.

In U.S. Pat. No. 3,641,018, patented Feb. 9, 1972, Harold B. Hayes and Gerald L. Huff disclosed an improved process for the preparation of 7-aminocephalosporanic acid from cephalosporin C by protecting the carboxyl groups, treating with a halogenating agent to convert the amido group in the 7-position to an imino halide, converting the imino halide to imino ether, and hydrolyzing the imino ether to 7-aminocephalosporanic acid with the improvement which comprises acylating the amino group in the adipamoyl side chain with an α-halo or α,α-dihalo $C_2$–$C_4$ alkanoyl group prior to the step of protecting the carboxyl groups. It has been the practice in some of these cleavage reaction manufacturing processes to use a water immiscible organic solvent, for example, chloroform, methylene chloride, or the like to conduct the carboxyl blocking reaction, the imino halide forming reaction, the imino-ether forming reaction on the cephalosporin C or derivative thereof. These reactions are followed by the aqueous treatment of the resulting reaction mixture to cleave the side chain and by base treatment of the organic solvent/water reaction mixture to precipitate and separate the 7-aminocephalosporanic acid or other nucleus from the reaction mixture. In those operations, emulsion problems have been experienced. These emulsions are sometimes difficult to break in a reasonable time. To avoid these emulsion problems, persons in the art have sought to avoid them by filtering the reaction mixture after the mixed anhydride carboxyl blocking step. This filtration step seems to remove the emulsion forming substances or at least keeps the emulsion from being too severe a problem. In some cases, because of the scale of the operation, it is not desired to filter the reaction mixture at least until after the aqueous treatment step. The emulsion that carries through several reactions can be filtered after the aqueous treatment step. Allowing the strongly acidic reaction mixture to stand for 5 minutes or so appears to break the emulsion. On a laboratory scale, corrosion resistant equipment such as glass centrifuge tubes is available. On a large scale, equipment such as a ceramic-lined centrifuge is difficult to obtain and is expensive. These emulsion problems cause yield losses, increase cycle time in the plant and require the use of extra operations or special equipment. In addition, the use of chloroform solutions in plant scale operations of this process causes discomfort to plant personnel during warm weather.

In efforts to avoid problems, such as the above, which occur especially when processing fermentation derived cephalosporin C or its derivatives various water miscible organic solvents for the cleavage reaction mixture have been tried. Acetonitrile is a good solvent for cleavage of cephalosporin C or its derivatives. However, acetonitrile is such a good solvent for 7-aminocephalosporanic acid that its use requires its removal for example, by distillation from the final reaction mixture, to separate the 7-aminocephalosporanic acid therefrom. There is a need in the cephalosporin cleavage art for a process improvement which will help simplify the cleavage operation, avoid emulsion problems, reduce discomfort to personnel, reduce the need for special equipment and save time in manufacturing operations.

It is an object of this invention to provide the cephalosporin cleavage art with a process improvement which will help to satisfy the above stated needs in the art. It is another object of this invention to provide to the cephalosporin cleavage art a choice of solvent media for the reactions which will permit the direct low temperature reactions, while permitting the use of a "one-pot" operation of the cleavage reaction, thus simplifying the process.

Summary of the Invention

Briefly, we have discovered that tetrahydrofuran, bis(2-methoxyethyl) ether, 2-methoxyethyl acetate, ethylene glycol diacetate, 1,4-dioxane and 1,3-dioxane are solvents for the cleavage reaction of cephalosporins, which permit the desired low temperature chemical reactions, avoid the emulsion problems previously experienced and permit the ready crystallization of 7–ACA, 7–ADCA, and 7–ADCA ester salt nuclei therefrom at their respective isoelectric points. These solvents also permit the carboxyl blocking, imino halid formation, imino-ester formation, and hydrolysis and base treatment reactions to be conducted in one vessel.

Detailed Description of the Invention

This invention provides an improvement to processes for cleaving the 7-carboxamido group from a cephalosporin to obtain the respective cephalosporin nucleus. The process improvement of this invention is particularly contemplated for use in processes for making 7-aminocephalosporanic acid (7–ACA) from cephalosporin C or its derivatives, in processes for making 7-aminodesacetoxy-cephalosporanic acid (7–ADCA) from desacetoxy cephalosporin C (U.S. Pat. No. 3,124,576) and in processes for cleaving the 7-acyl side chain from a 7-acylamidodesacetoxycephalosporin ester. This invention comprises using tetrahydrofuran (THF), bis-(2-methoxyethyl)ether, 2-methoxyethyl acetate, ethylene glycol diacetate, 1,4-dioxane, or 1,3-dioxane as the suspending or solvent medium for the carboxyl blocking, the imino halide formation step and the imino ether formation reactions. Tetrahydrofuran is preferred. The resulting reaction mixture is mixed with water or other aqueous medium for the hydrolysis step, and this latter reaction mixture is treated with a base, for example, ammonium hydroxide to adjust the pH of the mixture to the isoelectric point, that is, to the pH at which the desired nucleus compound precipitates from the reaction mixture.

We contemplate that the 7-acyl group for any 7-acylamido cephalosporanic, desacetoxycephalosporanic or 3-(substituted-methyl)cephalosporanic acid or easily cleavable ester, thereof can be cleaved by the process improvement of this invention. These starting materials include cephalosporin C, alkali metal salts of cephalosporin C (sodium and potassium being the most practical examples thereof), zinc and related metal complexes of cephalosporin C, desacetoxycephalosporanic acid and salts and esters thereof, as well as 7-acylamidodesacetoxy cephalosporanic acids and esters obtained by the ring-expansion of penicillin sulfoxide esters by procedures now described in the above patent literature. However, the most practical cephalosporin starting materials for use in this process improvement may be defined as having the formula

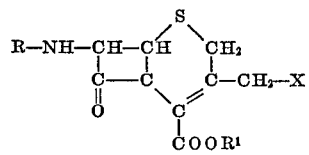

wherein R is aminoadipoyl, an aminoadipoyl in which the amino nitrogen is protected with $C_1$–$C_8$-alkanoyl, $C_6$ to $C_{12}$-aroyl, $C_1$ to $C_4$-alkyloxycarbonyl, $C_6$ to $C_{12}$-aryloxycarbonyl or such a protecting group substituted with halogen, particularly chlorine or bromine, nitro or $C_1$–$C_3$- alkyloxy groups, or R is a $C_2$ to $C_8$-alkanoyl, a $C_2$ to $C_8$-alpha-mono-or di halo-alkanoyl,

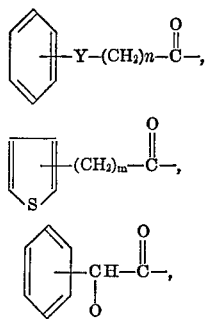

wherein Y is oxygen, sulfur or carbon to carbon bond; $n$ is an integer of from 1 to 3 and is at least 1 where $y$ is oxygen or sulfur; $m$ is an integer of from 1 to 3; Q is amino, hydroxy or carboxy; or R is otherwise the acyl group derived from a penicillin used to prepare the cephalosporin; X is $C_2$ to $C_6$-alkaanoyloxy, $C_2$ to $C_6$-thioalkanoyloxy, $C_6$ to $C_{12}$-thioaroyloxy, $C_1$ to $C_3$-alkoxythionocarbonylthio, $C_1$ to $C_6$-alkyloxy, $C_1$ to $C_6$-alkylthio, hydrogen, hydroxy, or mercapto.

$R^1$ can be hydrogen, an alkali metal cation such as sodium, potassium, lithium or an ester group which is removable by methods now known. Exemplary ester groups include 2,2,2-trichloroethyl, p-nitrobenzyl, p-methoxybenzyl, tert-butyl, phenacyl, benzhydryl, phthalimidomethyl, succinimidomethyl, and other protective groups in the prior patent literature.

Cephalosporins for use in this process improvement can be obtained by the penicillin sulfoxide ester ring expansion reactions referenced in the above cited patents. Penicillins for use in making such cephalosporins can be obtained from fermentation and precursor fermentation techniques described, e.g. Behrens U.S. Pats. Nos. 2,479,-295, –296, –297, 2,562,407, –408, –409, –410, –411 and 2,623,876. For example, cephalosporins wherein R is a $C_2$ to $C_8$– alkanoyl can be obtained from penicillins obtained via the processes described in the above Behrens patent references. Cephalosporins having the 7-acyl side chain (R) of the formula

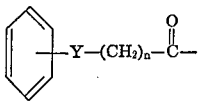

where Y and $n$ are as defined above can be obtained, for example, from penicillin G (benzyl penicillin) and penicillin V (phenoxymethyl penicillin) by the above referenced penicillin sulfoxide ester conversion process. 2-Thienyl and 3-thienyl penicillins and those found in U.S. Pat. No. 2,562,411 exemplify penicillins which can be used to make cephalosporin starting materials where R is

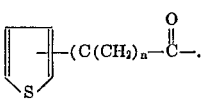

When R in the above formula is a 5-aminoadipoyl and X is acetoxy and $R^1$ is hydrogen the cephalosporin is cephalosporin C. When R is a 5-aminoadipoyl, X is hydrogen, and $R^1$ is hydrogen the cephalosporin is named desacetoxycephalosporin C. R can also be other groups such as acetyl, butyryl, heptanoyl, phenylacetyl, phenoxyoxyacetyl, phenylthioacetyl, 2 - thienylacetyl, 3-thienylacetyl, N-chloroacetamidoadipoyl, phenylglycyl, phenylmandelyl, phenylmalonyl, or the like.

Instead of being acetoxy, X in the above formula can be hydrogen, hydroxy, mercapto (—SH), propionoxy, butyroyloxy, hexanonoyloxy, acetylthio, propionylthio, ethylthionocarbonylthio, pentanoylthio, phenylthionocarbonylthio, tolylthionocarbonyloxy, naphthylthionocarbonylthio, methylthionocarbonylthio, ethylthionocarbonylthio, ethoxythionocarbonylthio, propoxythionocarbonylthio, methoxy, ethoxy, hexyloxy, methylthio, ethylthio, propylthio, thioacetyl, thiobutyryl, thiobenzoyl or p-nitrobenzylthio, or the like.

It is to be understood that when the cephalosporin contains an amino, hydroxy or mercapto group such group is blocked prior to the cleavage reaction. Amino, hydroxy, and mercapto blocking groups are well known to those skilled in the art. If the amino, hydroxy, or mercapto group is in the 7-acyl side chain of the cephalosporin, so that it will be lost in the cleavage reaction, it does not matter whether or not the blocking group is one which can be easily removed. The amino protecting group can be such as a $C_1$–$C_3$-alkanoyl, $C_6$–$C_{12}$-aroyl, $C_1$–$C_3$-alkyloxycarbonyl, or $C_6$–$C_{12}$-aryloxycarbonyl or one of such groups substituted by halo, nitro, or $C_1$–$C_3$-alkyloxy groups. Specific examples of amino protecting groups include formyl, acetyl, propionyl, chloroacetyl, dichloroacetyl, benzoyl, p-nitrobenzoyl, phthaloyl, p-methylbenzoyl, 2,4-dinitrophenyl, tert-butyloxycarbonyl, and benzyloxy carbonyl, and the like. Mixtures of amine protecting groups in a particular batch of cephalosporin to be cleaved can also be used. Such mixtures are obtained when a mixed anhydride such as chloroacetic propionic anhydride is used as the reagent to form the amino protecting group. Hydroxyl groups are commonly protected by the formation of esters, and particularly by the formation of formyl esters. Mercapto groups are protected by conversion to mixed sulfides such as the benzyl, benzhydryl, trityl or tertbutyl sulfides, by formation of mixed disulfides, by formation of thioesters, or as the thiocarbamyl, or S-acetamido-methyl group. Those skilled in the art will recognize that this list of blocking groups is merely illustrative and that there are many other amino, hydroxy and mercapto protecting groups that can be used.

In addition to cephalosporin C, alkali metal salts thereof, N-acylated cephalosporin C quinoline salts, prepared as described in Gene M. Wild application Ser. No. 198,986, filed Nov. 15, 1971 can also be used in the process of this invention.

In general, in practicing the improved process of this invention, the cephalosporin starting material is suspended or dissolved in tetrahydrofuran, bis(dimethoxyethyl) ether, methoxyethyl acetate, ethylene glycol diacetate, 1,4-dioxane or 1,3-dioxane, or water miscible organic liquid mixtures thereof having freezing points below the lowest desired reaction temperature in the cleavage reaction. A base such as an N,N-di-($C_1$ to $C_3$-alkyl)-aniline, quinoline or the like, and an acyl halide of the acid defined above are added to block the carboxyl groups. Tetrahydrofuran is the preferred reaction medium. After the carboxyl blocking reaction is completed, additional base is added, if needed, and then the halogenating agent such as phosphorus pentachloride is added after cooling the mixture to the desired reaction temperature. Temperatures on the order of –25 to –10° C. are preferred with tetrahydrofuran although lower temperatures can be used. Temperatures of from 0° to 30° C. may be preferred with one or more of the other solvents. The mixture is stirred in the cold until the reactions to form the imino chloride is substantially completed and then the selected alcohol is added to the cooled reaction mixture to form the imino-ether. Alcohols which can be used are exemplified by the $C_1$–$C_8$-alkanols such as methanol, ethanol, isopropanol, isobutanol, hexanol, 2-ethylhexanol, as well as cyclohexanol, cyclopentanol, 2-methoxyethanol the glycols such as ethylene glycol, 1,2- and 1,3-propylene glycol, glycerol and the like. We prefer to use ethylene glycol, 1,2- or 1,3-propylene glycol, isobutanol, 2-ethyl-hexanol, methanol, or 2-methoxyethanol depending on availability and cost. When the alcoholysis reaction is completed, water is added to effect hydrolysis of the side chain of the cephalosporin and to form the respective cephalosporin nucleus in the acid medium. If the alcoholysis was run at –10° C. or lower the reaction vessel was removed from the bath and stirred for about 5 minutes without a bath. Before the water treatment step, the mixture is allowed to warm to a temperature above the freezing point of water.

In our experience, the initial pH of the reaction medium after the water addition has generally been from 0 to 1. Thereafter, the tetrahydrofuran/water solution of the acidic reaction mixture is treated with a base to raise the pH of the reaction mixture to the pH at which the bulk of the product of the reaction precipitates (the isoelectric point). We prefer to use concentrated ammonium hydroxide although any economical base is suitable for this purpose.

The invention is further illustrated by the following detailed examples which are intended to be illustrated but not intended to be limiting of the scope of the claimed process improvement.

Example 1

This example illustrates the application of the process improvement of this invention to a process for cleaving N-chloroacetyl cephalosporin C quinoline salt with phosphorus pentachloride.

A 14.1 g. portion of N-chloroacetyl cephalosporin C quinoline salt was suspended in 100 ml. of tetrahydrofuran (THF). To this suspension there was added 14.9 ml. of N,N-diethylaniline at 20° C. and then 10.0 ml. of acetyl chloride. After a few minutes of stirring another 5.0 ml. of acetyl chloride was added. After stirring for a few minutes to insure complete reaction to form the mixed anhydride of the N-chloroacetyl cephalosporin C, there was added 10.9 ml. of N,N-diethylaniline, the mixture was cooled to −10° C. and then 10.0 g. of phosphorus pentachloride was added to form the iminochloride. After the reaction had subsided 50 ml. of methanol was added at −20° C. using a carbon tetrachloride/Dry Ice bath and the temperature rose to 15° C. The mixture was cooled to −20° C. and stirred for about 35 minutes and then 100 ml. of water was added to the reaction mixture. The mixture was stirred for about 2 minutes and removed from the carbon tetrachloride/Dry Ice bath and then treated with concentrated ammonium hydroxide to adjust the pH from 0.5 (before $NH_4OH$ addition) to 3.5 (the isoelectric point of 7-aminocephalosporanic acid in this mixture). About 24.5 ml. of ammonium hydroxide was used. The crystals of 7-aminocephalosporanic acid (7–ACA) were filtered from the THF/$H_2O$ reaction mixture, the filter cake was rinsed with 50 ml. of water and then with 50 ml. of methanol. The wet weight of 7–ACA was 4.3 g. After drying in a vacuum oven (8–10 mm. pressure) at 40° C. overnight the dry 7–ACA weighed 3.65 g. The purity was 93.0 percent by ultraviolet spectrum assay and 94.3 percent by the nicotinamide assay. The percent yield was 63.3 percent (based on nicotinamide assay).

A repeat of this operation gave a dry weight yield of 7–ACA of 3.5 g. (58.6 percent yield).

Example 2

This example illustrates the use of the process improvement of this invention in combination with a study of the effect of the time of stirring the reaction mixture after ethylene glycol addition.

In reaction vessel A 14.1 g. of N-chloroacetyl cephaloacetyl cephalosporin C quinoline salt was suspended in 100 ml. of THF and then 15.0 ml. of N,N-diethylaniline was added at 23° C. Then 10.0 ml. of acetyl chloride was added as the temperature rose to 26.5° C. After 15 minutes of stirring the mixture was cooled to −10° C. and then 11.0 ml. of N,N-diethylaniline was added during which time the temperature of the mixture rose to 0° C. The mixture was cooled again to −15° C. and then 10.0 g. of phosphorus pentachloride with a 20 ml. THF rinse were added to the mixture. The temperature rose from −15° C. to 5° C. After 40 minutes of stirring in the cold (−15 to −20° C.) to insure complete reaction, 25.0 ml. of ethylene glycol was added. The temperature rose from −20° C. to 8° C. The mixture was cooled to −20° C. and stirred for 1 hour. The reaction mixture vessel was then transferred to an ice water bath for 2 minutes. As the temperature warmed to −10° C. 100 ml. of water (room temperature) was added. The temperature of the mixture rose from −10° C. to 21° C. Then after the temperature subsided to 10° C. the pH of the mixture (0.6) was raised 3.5 with 18 ml. of concentrated ammonium hydroxide. Crystals were noted in the mixture at pH 2.8 to 3.0. The 7-ACA crystalline product was filtered from the liquid reaction mixture, rinsed with 25 ml. of cold 50 percent THF/$H_2O$ mixture and then with 25 ml. of cold THF.

In reaction vessel B, the same proportions of reactants were combined as are described for reaction vessel A above, the difference in treatment being that after the ethylene glycol addition the mixture was stirred in the carbon tetrachloride/Dry Ice bath (−20° C.) for 1 hour and 5 minutes (instead of 1 hour) and then in the ice bath (5° to 10° C.) for 32 minutes (instead of 2 minutes) before addition of water and concentrated ammonium hydroxide (17 ml.).

In reaction vessel C the reactants were mixed in the same proportions as is described above for reactions vessel A with the only material difference in treatment being that after the ethylene glycol addition the reaction mixture was cooled in the −20° C. bath for 1 hour and 23 minutes and then stirred in the ice bath for 1 hour before water and concentrated ammonium hydroxide (17 ml.).

In each experiment, A, B and C, the wet 7–ACA was filtered and dried. The dry weights, purities and percent yields of each 7–ACA product are given below:

|  | A | B | C |
|---|---|---|---|
| Dry weight | 1.97 | 3.73 | 4.23 |
| U.V. assay | 91.9 | 92.6 | 92.1 |
| Nicotinamide assay | 94.0 | 93.7 | 94.1 |
| Percent yield | 34.0 | 64.3 | 73.3 |

Example 3

This example illustrates the application of the process improvement of this invention in combination with a study of the effect of added mixed anhydride blocking agent on the yield of 7–ACA obtained.

A suspension of 14.1 g. (20 millimoles) of the N-chloroacetyl cephalosporin C quinoline salt in 100 ml. of THF was treated with 15 ml. of N,N-diethylaniline at 23° C. Then 10.0 ml. of acetyl chloride was added. The temperature of the mixture rose from 23° C. to 28.5° C. About 10 minutes later an additional 5.0 ml. of acetyl chloride was added. The temperature moved from 27° C. to 29° C. When the addition of acetyl chloride was completed cooling of the mixture was begun. At about −15° C. the mixture was treated with 11.0 ml. of N,N-diethylaniline and then with 10.0 g. of phosphorus pentachloride and 25 ml. of THF during which time the temperature rose from −15° C. to 2° C. After stirring for 30 minutes 25 ml. of ethylene glycol was added at −20° C. The temperature rose to 8° C. After stirring for about 22 minutes in a =20° C. bath, the reaction mixture vessel was transferred to an ice bath (0° to 5° C.). After stirring for 80 minutes to insure complete reaction 100 ml. of water was added. The pH of the mixture thereafter was 0.3. The mixture was treated with concentrated ammonium hydroxide to raise the pH to 3.5, to crystallize the 7–ACA contained therein. Th crystalline 7–ACA was filtered, washed with 25 ml. of 50 percent THF/$H_2O$ mixture and then with 25 ml. of THF. After drying, the 7–ACA product weighed 4.53 g., had a 94.1 percent purity by nicotinamide assay for a 78.4 percent yield, based on that purity assay.

Example 4

This example illustrates the use of the process improvement of this invention in combination with a study of the effect on stability of 7–ACA in a THF/H$_2$O solution thereof which is allowed to stand for 2 hours after water addition.

A suspension of 28.2 g. (40 mmoles) of N-chloroacetyl cephalosporin C quinoline salt in 200 ml. of THF was treated with 30.0 ml. of N,N-diethylaniline and then with 20.0 ml. of acetyl chloride. After stirring to insure optimum reaction 22.0 ml. of N,N-diethylaniline and then 20.0 g. of phosphorus pentachloride and 20 ml. of THF were added. After stirring for about 45 minutes 50.0 ml. of ethylene glycol was added to the reaction mixture which was being cooled in the carbon tetrachloride/Dry Ice bath. The reaction mixture was then stirred in an ice bath for 90 minutes to insure complete reaction. After cooling the mixture to −10° C. the reaction mixture was treated with 200 ml. of water. The temperature changed from −10° C. to 20° C. The mixture was cooled to 10° C. and then split into 2 aliquots of 271 ml. each. The pH of the first portion (A) was adjusted immediately to 3.5 with concentrated ammonium hydroxide (15 ml.) to to crystallize the 7–ACA therefrom. The 7–ACA was collected, rinsed as described above and dried. The dry weight was 4.30 g. (93.9 percent pure, nicotinamide assay) for a 74.4 percent yield.

The second 271 ml. portion (B) was stirred for 2 hours at 0° to 5° C. and then treated with concentrated ammonium hydroxide (17.5 ml.) to pH 3.5 to crystallize and precipitate the 7–ACA contained therein. After filtering, rinsing and drying as above, there was obtained 4.38 g. of 7–ACA, 91.4 percent pure by the nicotinamide assay for a yield of 73.6 percent.

Example 5

A suspension of 14.1 g. of N-chloroacetyl cephalosporin C quinoline salt in 100 ml. of THF was treated essentially as described in Example 1 to form the mixed anhydride, and with 10.0 g. of phosphorus pentachloride to form the iminochloride. The resulting reaction mixture was treated with 65 ml. of isobutyl alcohol at −20° C., and then with 100 ml. of water. Then 22 ml. of concentrated ammonium hydroxide was added to raise the pH of the reaction mixture to the isoelectric point. The 7–ACA crystalline material was filtered, rinsed, dried as described above to obtain 4.06 g. of 7–ACA having a 94.1 percent purity (nicotinamide assay) for a 70.4 percent yield.

Example 6

This example illustrates the process improvement of this invention using bis(-methoxyethyl) ether as the organic solvent medium for the PCl$_5$ cleavage reaction.

A 14.1 g. (20 mmole) portion of N-chloroacetyl cephalosporin C quinoline salt in 100 ml. of bi-(2-methoxy-ethyl) ether was treated with 26.0 ml. of N,N-diethylaniline, 15.0 ml. of acetyl chloride and cooled to −20° C. Then 10.0 g. of phosphorus pentachloride and 25.0 ml. of ethylene glycol was added and followed by 150 ml. of water, as described above. Concentrated ammonium hydroxide (21 ml.) was added to raise the pH of the mixture to 3.5. There was obtained 1.4 g. of 7-aminocephalosporanic acid (7–ACA) having a purity of 81.4 percent for a yield of 25.7 percent.

Example 7

A 10 g. portion of sodium cephalosporin C in 100 ml. of tetrahydrofuran was treated with 26.0 ml. of N,N-diethylaniline at 24° C. The mixture was then treated with 15.0 ml. of acetyl chloride to block the carboxyl groups with mixed anhydride groups. Presumably the amino group in the side chain is also acylated. After stirring to insure complete reaction, the mixture was treated with 10.0 g. of phosphorus pentachloride. The temperature rose from 25° C. to 30° C. After stirring, the resulting imino chloride reaction mixture was treated with 25.0 ml. of ethylene glycol at −15° C. The temperature rose to 10° C. during reaction. After 45 minutes, 100 ml. of water was added to the mixture at −15° C. The temperature rose to 22° C. The pH of the mixture was adjusted to 3.5 with concentrated ammonium hydroxide. Crystals appeared at pH 3.5. The crystalline precipitate, 7–ACA, was fitered, rinsed with 25 ml. of water and 25 ml. of acetone and dried. The dried product weighed 1.72 g. It was 73.2 percent pure by the nicotinamide assay for a yield of 23.2 percent.

Example 8

This example illustrates the use of the process improvement of this invention in combination with the use of quinoline as a catalyst for the PCl$_5$/ethylene glycol/H$_2$O cleavage of sodium cephalosporin C in THF reaction. The use of catalytic quantities of quinoline in this sodium cephalosporin C cleavage forms no part of the invention claimed herein.

A. A 9.8 g. (20 millimoles) of sodium cephalosporin C in 100 ml. of tetrahydrofuran (THF) was treated with 1.0 ml. of quinoline and then with 15.0 ml. of N,N-diethylaniline. Then 20.0 ml. of acetyl chloride was added. The temperature rose from 22° C. to 35° C. After 25 minutes stirring 11.0 ml. of N,N-diethylaniline followed by 10.0 g. of phosphorus pentachloride were added to the mixture at −20° C. After stirring to insure complete reaction 25.0 ml. of ethylene glycol was added at −20° C. The temperature rose to 23° C. After a few minutes the mixture was transferred to an ice bath. At 3° C. 150 ml. of water was added. The temperature of the mixture rose to 27° C.

B. The above reaction was repeated except that only 15.0 ml. of ethylene glycol was added.

Each reaction mixture was stirred 3 minutes after water addition and then the pH thereof was adjusted to 3.5 with concentrated ammonium hydroxide. The 7–ACA which crystallized from each reaction mixture was filtered, rinsed with a 25 ml. water/25 ml. acetone mixture and then dried. The yields were as follows:

|  | A | B |
|---|---|---|
| Dry weight, g | 4.39 | 4.64 |
| Nicotinamide assay, percent | 92.0 | 90.5 |
| Yield, percent | 74.3 | 77.1 |

Example 9

Sodium cephalosporin C (20 mmoles, about 10 g.) is added to a 500 ml. 3-necked round bottom flask equipped with a drying tube, thermometer and a stopper. To the flask is then added 50 ml. of THF, 35 ml. of N,N-diethylaniline and 30 ml. of acetyl chloride. The reaction mixture is kept in a CCl$_4$ bath. The temperature of the reaction mixture normally rises to about 40° C. after the reaction appears to be complete (about 15 min.) Dry Ice is added to the CCl$_4$ bath. When the reaction temperature has decreased to about −15° C. 11.0 ml. of N,N1diethylaniline is added followed by 10.0 g. of PCl$_5$. The reaction mixture is stirred in the CCl$_4$ Dry Ice bath (−15° C to −20° C.) for about one hour. Then 25 ml. of ethylene glycol is added to the reaction mixture, which is allowed to remain in the CCl$_4$ Dry Ice bath until the temperature has decreased to about 0° C. The reaction mixture is then placed in an ice bath (0 to 5° C.) and stirred for one hour and 150 ml. of water is added. After stirring for 3–5 min. the pH is adjusted to pH 3.5 with conc. NH$_4$OH. The crystallized 7–ACA is collected by filtration and washed on the filter with 25 ml. H$_2$O followed by 25 ml. of acetone. The 7–ACA is dried *in vacuo* at 40° C. overnight. The yields are generally 70 to 75 percent.

Example 10

This example illustrates the use of the process improvement of this invention in combination with the use of isobutyl alcohol as the alcohol reactant in this cleavage process.

A. A suspension of 14.1 g. (2.0 mmoles) of N-chloroacetyl cephalosporin C quinoline salt in 100 ml. of THF was treated with 15.0 ml. of N,N-diethylaniline, then with 15.0 ml. of acetyl chloride, cooled to approximately −10° C., and then treated with 11.0 ml. of N,N-diethylaniline. The mixture was cooled in a carbon tetrachloride/Dry Ice bath and then 10.0 g. of phosphorus pentachloride, and a 10 ml. THF rinse, were added. After stirring for 50 minutes 15 ml. of isobutyl alcohol was added. After the reaction appeared to be completed, 100 ml. of water was added, the temperature rose from −10° C. to 20° C.

B. Another reaction sequence was run essentially as described above except that 25 ml. of isobutyl alcohol was used.

C. Another reaction sequence was run essentially as described in part A above, except that 50 ml. of isobutyl alcohol was used. The results were as follows:

|  | A | B | C |
| --- | --- | --- | --- |
| Wt. 7-ACA, g | 2.08 | 3.73 | 4.05 |
| Nic assay | 83.8 | 81.6 | 85.3 |
| Percent yield | 32.1 | 56.0 | 63.5 |

Example 11

Cleavage of 7-acyl side chain from p-Nitrobenzyl 7-phenoxyacetamidodesacetoxycephalosporinate ester in tetrahydrofuran.

To a mixture of 10.2 g. (20 millimoles) of p-nitrobenzyl 7 - phenoxyacetamidodesacetoxycephalosporinate ester and 11.0 ml. of N,N-diethylaniline in 100 ml. of tetrahydrofuran, cooled in a carbon tetrachloride/Dry Ice bath, there was added 10.0 g. of phosphorus pentachloride. The temperature rose from −11° C. to −2° C. The mixture was stirred for 75 minutes as the temperature subsided to insure complete reaction and then treated with 15.0 ml. of ethylene glycol. The temperature rose from −18° C. to +20° C. After about 105 minutes 10 ml. of water was added. The temperature rose from 5° C. to 18° C. The mixture was treated with 3.81 g. of p-toluenesulfonic acid to form the p-nitrobenzyl-aminodesacetoxycephalosporanate - p - toluenesulfonate ester salt. Some difficulty was experienced in attempting to isolate this ester-salt in good yield from this medium. The crystals were re-dissolved, filtered, the filtrate acidified to pH 0.5 with hydrochloric acid, the solution was then treated with ammonium hydroxide to adjust the pH to 4.5. The crystals of p-nitrobenzyl 7-aminodesacetoxycephalosporanate hydrochloride ester salt were filtered and weighed (4.95 g.). The yield was thus about 65 percent thin layer chromatography, ultraviolet and infrared analyses of the product indicate that it is the named product.

Example 12

Cleavage of sodium cephalosporin C in 1,4-Dioxane.

To a mixture of 9.3 g. of sodium cephalosporin C in 100 ml. of 1,4-dioxane there was added 1.0 ml. of quinoline. The temperature of the mixture was 25° C. To this mixture, while stirring, 15.0 ml. of N,N-diethylaniline was added. Then 20.0 ml. of acetylcholride was added. The temperature rose from 24.5° C. to 38° C. Ice bath cooling was begun, then 11.0 ml. of N,N-diethylaniline followed by 10.0 g. of phosphorus pentacholride were added. The temperature rose from 15° C. to 25° C. but then subsided to +5° C. Then 20.0 ml. of ethylene glycol was added in two portions. The temperature rose from −3° C. to 25° C., subsided to 22° C. and then rose to 26° C. during the addition of the second portion of the ethylene glycol. After stirring to insure complete reaction, while cooling, 150 ml. of cold (7° C.) water was added. The pH of the mixture was about 0.25. Then ammonium hydroxide (22 ml.) was added until the 7-aminocephalosporanic acid precipitated. This product was filtered, washed with 25 ml. of water and then with 25 ml. of acetone. It weighed 3.22 g. (55.3% yield) after drying. The purity was 95.4% by ultraviolet spectral analysis and 93.4% by the nicotinamide assay.

Example 13

Cleavage of sodium cephalosporin C in 1,3-Dioxane.

The procedure of Example 12 was repeated except that the sodium cephalosporin C was suspended in 1,3-dioxane as the solvent medium. In addition, propylene glycol was used in place of ethylene glycol as the alcohol. At the compeltion of the process there was obtained 2.35 g. (dry weight) (about 40% yield) of 7-aminocephalosporanic acid.

Example 14

Cleavage of Desacetoxycephalosporin C in tetrahydrofuran

Following the procedure of Example 11, a mixture of 1.98 g. of desacetoxycephalosporin C (about 50% pure) in 25 ml. of tetrahydrofuran was treated 0.3 ml. of quinoline, 3.8 ml. of N,N-diethylaniline, 5.0 ml. of acetyl chloride, 2.7 ml. of N,N-diethylaniline, 2.5 g. of phosphorus pentachloride, 5.0 ml. of ethylene glycol, 38 ml. of water and 60 ml. of ammonium hydroxide produced a solution which gave a positive test for 7-aminodesacetoxycephalosporanic acid.

Example 15

Cleavage of sodium cephalosporin C in tetrahydrofuran using cyclohexanol, glycerin or propylene glycol as alcohol Following the procedure of Example 12, 9.3 g., (20 millimole scale) of sodium cephalosporin C in 100 ml. of tetrahydrofuran, treated with quinoline, N,N-diethylaniline, acetyl chloride, N,N-diethylaniline, and then with phosphorus pentachloride, were treated with:

(A) 50.0 ml. of cyclohexanol and then 150.0 ml. of water,
(B) 20.0 ml. of glycerin and then 150.0 ml. of water, or
(C) 20.0 ml. of 1,2-propylene glycol and then 150 ml. of water.

The resulting reaction mixtures were neutralized to pH 4.5 with ammonium hydroxide to precipitate 7-aminocephalosporanic acid. The precipitates were filtered, dried and weighed. The yields (dry weights) of 7-aminocephalosporanic acid were as follows:

|  | A | B | C |
| --- | --- | --- | --- |
| Weight, g | 3.33 | 4.00 | 4.52 |
| Yield, percent | 46.0 | 66.6 | 78.4 |
| Purity (NIC assay), percent | 75.1 | 90.6 | 94.4 |

NOTE.—The yields were calculated based upon the indicated purities.

Example 16

In a suitable vessel 9.8 g. of sodium cephalosporin C in 50 ml. of 2-methoxyethyl acetate was stirred at room temperature while 1.0 ml. of quinoline and then 15.0 ml. of N,N-diethylaniline were added. Then 20.0 ml. of acetyl chloride was added. The temperature rose from 23° C. to 46° C. Then 11.0 ml. of N,N-diethylaniline was added. After cooling the mixture to −15° C. 10.0 g. of phosphorus pentachloride was added. The temperature rose to −4° C. before subsiding to −15° C. again. Then 50.0 ml. of methoxyethanol was added to the mixture. The temperature rose from −15° C. to +30° C.

The above procedure was repeated to produce two batches for treatment with (a) 150 ml. of water or with (b) 100 ml. of water.

(a) The temperature of the reaction mixture treated with 150 ml. of water rose from 4° C. to 13° C. The pH was 0.4. Ammonium hydroxide (concentrated, 24 ml.) was added to precipitate the 7-aminocephalosporanic acid.

(b) The temperature of the reaction mixture treated with 100 ml. of water rose from 5° C. to 20° C. The pH was 0.2. Again, 24 ml. of concentrated ammonium hydroxide was added to raise the pH of the mixture and precipitate 7-aminocephalosporanic acid.

In each batch the 7-aminocephalosporanic acid crystals were filtered, washed with 25 ml. of water and then with 25 ml. of methanol, and dried in a vacuum oven at 35° C. for 4 days. The weights, purities and yield of each 7-aminocephalosporanic acid product were as follows:

|  | A | B |
| --- | --- | --- |
| Dry wt. (g.) | 3.92 | 3.89 |
| Purity: |  |  |
| Ultraviolet | 95.0 | 96.1 |
| Nicotinamide | 96.4 | 97.9 |
| Yield (percent, based on nicotinamide assay purity) | 69.6 | 70.1 |

Example 17

To a mixture of 9.8 g. of sodium cephalosporin C in 100 ml. of tetrahydrofuran there was added 1.0 ml. of tetrahydrofuran there was added 1.0 ml. of quinoline and 15.0 ml. of N,N-diethylaniline. To this mixture there was added 20.0 ml. of acetyl chloride. The temperature rose from 21° C. to 35° C. The mixture was cooled and 11.0 ml. of N,N-diethylaniline was added. At −16° C. 10 g. of phosphorus pentachloride was added. The temperature rose to −2° C. Then 25.0 ml. of methanol was added at −20° C. The temperature rose to +16° C. After stirring to insure complete reaction 150 ml. of water was added to +3° C. The temperature rose to +10° C. The pH of the resulting reaction mixture was 0.5. Ammonium hydroxide (conc. 20 ml.) was added to raise the pH of the mixture to the point at which 7-aminocephalosporanic acid precipitates. After filtering there was obtained 3.82 g. of 7-aminocephalosporanic acid, having an ultraviolet purity of 94.4 percent, a nicotinamide assay purity of 93.2 percent for a yield of 65.5 percent.

In summary, in practicing the improved process of this invention one gains the advantage of a single phase system in one reaction vessel after addition of the water reactant. This system contains the 7–ACA, 7–ADCA or other cephalosporin nucleus in solution. Upon the addition of base to raise the pH of the system to the isoelectric point of the product (pH 3.5 for 7–ACA), the product crystallizes out in yields comparable to or higher than the yields obtainable in the prior art processes, depending upon the choice of starting material. This improvement on the known cleavage process thus provides the advantages of a one reaction vessel process with no phase separation, and no solvent distillation or boil down operations to contend with. In addition, this improved process provides a method for destroying penicillin N in admixture with cephalosporin C or desacetoxycephalosporin C during the cleavage process to form 7-aminocephalosporanic acid from cephalosporin C or 7 - aminodesacetoxycephalosporanic acid from desacetoxycephalosporin C. For example, we have cleaved sodium cephalosporin C, deliberately contaminated with about 10 percent by weight of penicillin N to obtain 7-aminocephalosporanic acid. When this 7–ACA was converted to sodium cephalothin antibiotic, and this antibiotic checked for penicillin content by a standard method, no penicillin was observed.

We claim:

1. In a process for cleaving the 7-carboxamido group of a cephalosporin compound of the formula

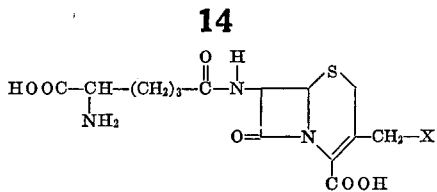

wherein X is hydrogen, hydroxy, or $C_2$–$C_6$ alkanoyloxy; or the alkali metal, zinc and quinoline salts thereof; which comprises blocking the amino, carboxy or hydroxy groups; treating the blocked cephalosporin with a halogenating agent to convert the 7-carboxamido group of the cephalosporin to an imino halide, treating the imino halide with an alcohol to form an imino ether, and hydrolyzing the imino ether to form a 7-amino group, the improvement which comprises conducting the carboxyl group protecting reaction, and the 7-carboxamido cleavage reaction in an organic diluent selected from tetrahydrofuran, bis(2-methoxyethyl) ether, 2-methoxyethyl acetate, ethylene glycol diacetate, 1,4-dioxane, 1,3-dioxane and water miscible organic liquid mixtures thereof.

2. A process as defined in claim 1 wherein cephalosporin C, an alkali metal salt of cephalosporin C, or an N-acylated cephalosporin C compound is (1) suspended or dissolved in tetrahydrofuran, and therein (2) treated with an $C_1$–$C_6$-alkanoyl halide in the presence of a base to block the carboxyls of the cephalosporin C molecule with anhydride groups, (3) the cephalosporin C anhydride product from step (2) is treated with base and phosphorus pentachloride at −25° C. to 30° C. to form the imino halide of the cephalosporin C molecule (4) the imino halide from step (3) is treated with an alcohol to form the cephalosporin C imino-ether, (5) the cephalosporin C imino-ether from step (4) is treated with water to cleave the cephalosporin C side chain, (6) the reaction product from step (5) is treated with base to adjust the pH of the mixture to the isoelectric point of 7–ACA to form 7–ACA, and (7) the 7–ACA is recovered from the reaction medium.

3. A process as defined in claim 1 wherein an N-chloroacetyl cephalosporin C quinoline salt is suspended in tetrahydrofuran and treated with an N,N-bis($C_1$ to $C_3$-dialkyl)aniline and with acetyl chloride to block the carboxyl groups to mixed anhydride groups, the mixed anhydride is cooled to less than 0° C. and is treated with phosphorus pentachloride in the presence of base to form the imino chloride, the imino chloride is treated with a $C_1$ to $C_4$ alkanol to form the imino-ether, the imino-ether is treated with an aqueous medium to cleave the 7-acyl side chain and to form 7-amino-cephalosporanic acid therein, and the pH is adjusted with a base to a pH at which 7-aminocephalosporanic acid precipitates therefrom.

4. A process as defined in claim 1 wherein an alkali metal salt of cephalosporin C is suspended or dissolved in tetrahydrofuran and treated with an N,N-bis($C_1$ to $C_3$-dialkyl)-aniline and with acetyl chloride to block the carboxyl groups with mixed anhydride groups, the mixed anhydride is cooled to less than 0° C. and is treated with phosphorus pentachloride in the presence of a base to form the imino-chloride, the imino-chloride is treated with an alcohol to form the imino-ether, the imino-ether is treated with an aqueous medium to cleave the 7-acyl side chain and to form 7-aminocephalosporanic acid therein, and the pH of the mixture is adjusted with a base to a pH at which 7-aminocephalosporanic acid precipitates therefrom.

5. A process as defined in claim 1 which comprises
(1) mixing sodium cephalosporin C with tetrahydrofuran,
(2) treating the mixture from step (1) with quinoline,
(3) treating the mixture from step (2) with acetyl chloride in the presence of a base to block the carboxyl groups of the cephalosporin C molecule with anhydride groups, (4) treating the anhydride product from step (3) with phosphorus pentachloride in the presence of a base to form the imino halide,
(5) treating the imino halide from step (4) with methanol to form the methyl imino-ether,
(6) treating the methyl imino-ether from step 5 with water to form 7-aminocephalosporanic acid, in the reaction mixture,
(7) treating the mixture from step 6 with sufficient ammonium hydroxide to raise the pH of the mixture at which the 7-aminocephalosporanic acid precipitates from the reaction mixture, and
(8) recovering the 7-aminocephalosporanic acid.

References Cited

UNITED STATES PATENTS

| | | | |
|---|---|---|---|
| 3,499,909 | 3/1970 | Weissenburger et al. | 260—243 C |
| 3,575,970 | 4/1971 | Weissenburger et al. | 260—243 C |

FOREIGN PATENTS 2,126,037  12/1971  Germany.

NICHOLAS S. RIZZO, Primary Examiner

U.S. Cl. X.R.

260—239.1; 424—246, 271